Feb. 16, 1960

H. E. HODGSON 2,925,153

ELECTROMAGNETIC BRAKE

Filed Nov. 27, 1953

Inventor
Howard E. Hodgson
By W. E. Lyon
Attorney

United States Patent Office 2,925,153
Patented Feb. 16, 1960

2,925,153

ELECTROMAGNETIC BRAKE

Howard E. Hodgson, Wauwatosa, Wis., assignor to Cutler-Hammer, Inc., Milwaukee, Wis., a corporation of Delaware Application November 27, 1953, Serial No. 394,593

11 Claims. (Cl. 188—171)

This invention relates to improvements in electromagnetic brakes.

An object of the invention is to provide an improved brake having brake shoe operating levers which can be easily removed to facilitate repair and replacement of various brake parts.

Another object is to provide an electromagnetic brake having improved adjusting means associated therewith.

Another object is to provide an electromagnetic brake having various parts pivotally mounted in a relatively simple and inexpensive manner.

A more specific object is to provide an electromagnetic brake employing means for maintaining a lubricating film on the pivotal mounting means for the brake shoe operating levers.

Other objects and advantages of the present invention will become apparent from the following specification when read in view of the accompanying drawings.

The accompanying drawings illustrate one embodiment of the present invention, it being understood that many modifications in the details of construction and arrangement of the various parts are possible without departing from the spirit and scope of my invention as defined by the appended claims.

In the drawings.

Like reference characters indicate corresponding parts throughout the several views of the drawings.

Figure 1:
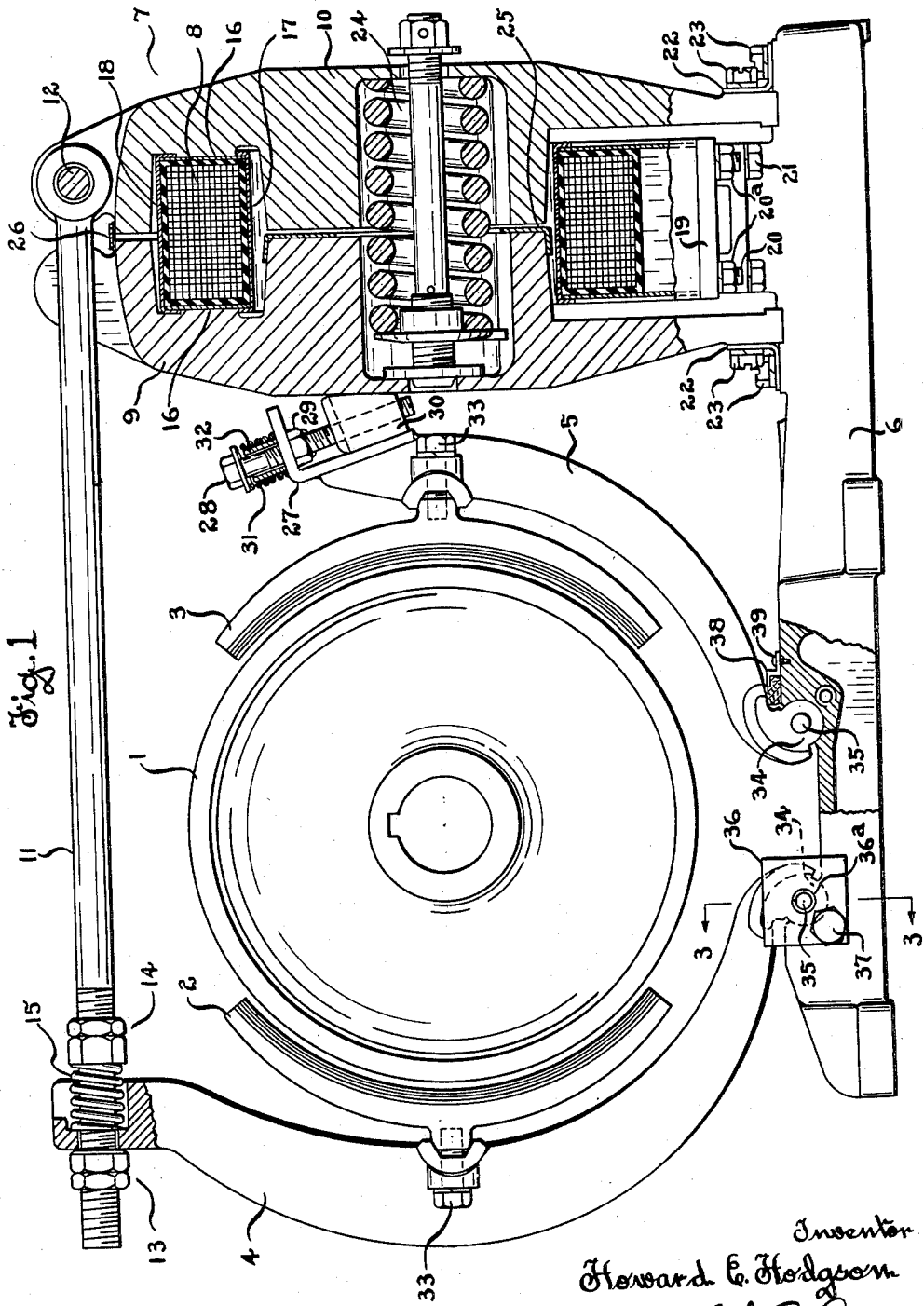
Figure 1 is a side elevational view of an electromagnetic brake embodying the present invention, several of the parts thereof being shown in section.

Referring to Fig. 1, it illustrates a brake drum 1 to be secured to a motor or other device to be braked, opposed brake shoes 2 and 3 for frictionally engaging said drum on opposite sides thereof, and upwardly extending levers 4 and 5 to support and operate said shoes respectively. The lower ends of levers 4 and 5 are pivotally mounted on a base 6, and an electromagnet 7 also mounted on said base 6 is provided for operation of said levers.

Electromagnet 7 is provided with a field element including an energizing winding 8 and cooperating armature members 9 and 10 arranged on opposite sides thereof. Armature 10 is pivotally mounted on base 6 and is operatively connected to lever 4 by a link 11. Said link 11 is attached to armature member 10 by means of pin 12, and to lever 4 by means of pairs of nuts 13 and 14 and spring 15 as shown in Fig. 1. Such connection between link 11 and lever 4 provides adjustability as is well known in the electromagnetic brake art. Armature member 9 is also pivotally mounted on base 6 and is operatively connected to lever 5 through adjustable spacing means to be hereinafter described.

Figure 2:
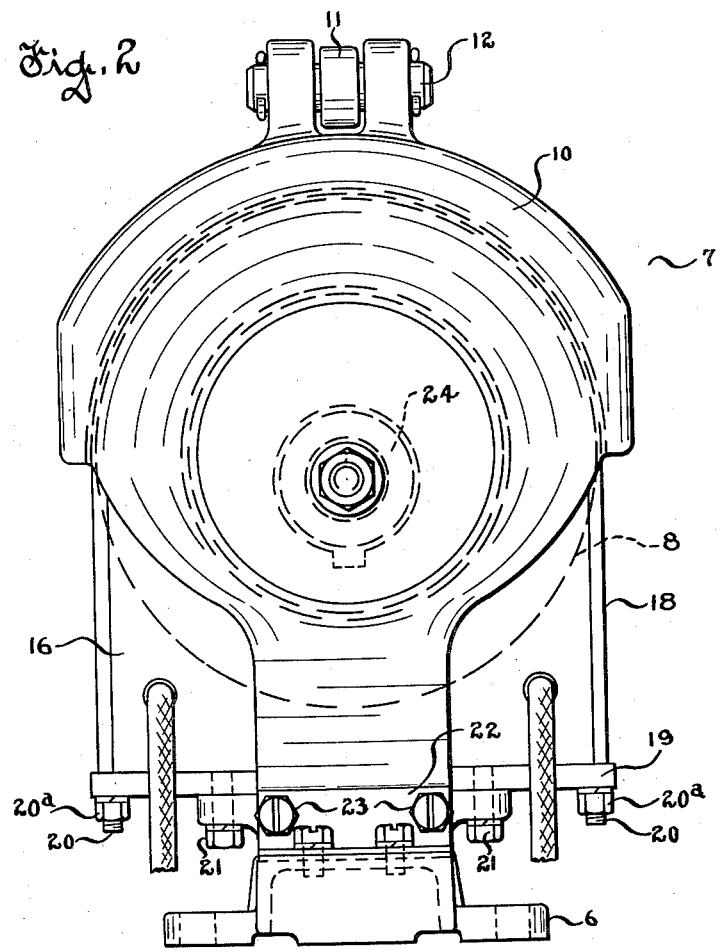
Fig. 2 is an end view of the brake shown in Fig. 1.

Energizing winding 8 is completely encased by side plates 16, ring member 17, cover strap 18, and support plate 19. Cover strap 18 is fastened to support plate 19 by means of threaded studs 20 and nuts 20ª. Said studs 20 are welded to strap 18 in any well known manner. As shown in Fig. 2, support plate 19 is firmly attached to base 6 by means of bolts 21 extending through flange portions of base 6 and threadedly engaging said support plate 19.

As shown in Fig. 1, armature members 9 and 10 are positioned in elongated shallow recesses formed in base 6 and are pivotally mounted therein by means of straps 22 formed of resilient material such as spring steel. Bolts 23 are provided for attaching said straps 22 to armature members 9 and 10 and to base member 6.

Adjustable spring means 24 is provided for effecting separation of armature members 9 and 10 whenever energizing winding 8 is in an unenergized state. Such spring means is well known in the electromagnetic brake art and permits adjustment of the compressive force of the operating spring in a well known manner. Also provided in electromagnet 7 is a spacer 25 and sealing strap 26, each of which functions in a well known manner.

The adjustable spacing means between lever 5 and armature member 9 comprises an L-shaped mounting bracket 27, bolt 28, nut 29, and wedge-shaped spacer block 30. Member 27 is attached as shown in Fig. 1 to lever 5 by any suitable means such as by welding. It is believed apparent that bracket 27 need not be a separate element but could be formed integral with lever 5. Bolt 28 extends through an opening formed in member 27 and threadedly engages spacer block 30. A compression spring 31 and sleeve 32 are provided to retain nut 29, which is welded to bolt 28, in abutting relation with the L-shaped bracket 27. By this means the relative position of armature member 9 and lever 5 can be varied by turning bolt 28 to move spacer block 30.

Each of the brake shoes 2 and 3 is attached to its respective operating lever 4 and 5 by means of a pair of bolts 33 the shanks of which extend through clearance openings in the operating lever and threadedly engage the brake shoe. Such openings in levers 4 and 5 are elongated vertically to permit adjustment of the brake shoes in a vertical plane.

Figure 3:
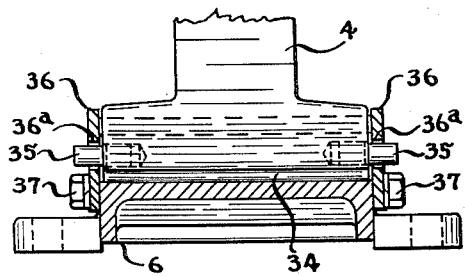
Fig. 3 is a fragmentary sectional view taken substantially along line 3—3 of Fig. 1.

The lower end portion of each of said operating levers 4 and 5 is formed into a segment of a cylinder 34. As shown in Fig. 1, base 6 is formed with a surface complemental to said cylinder segment 34 to thus cooperate therewith as a roller and socket joint. As illustrated in Figs. 1 and 3, said cylinder segments 34 are provided with recesses for retention of pins 35. Said pins 35 fit into openings 36ª formed in mounting plates 36. Said plates 36 are mounted on base 6 by means of bolts 37 as shown in Figs. 1 and 3. Thus operating levers 4 and 5 can be pivotally moved relatively to base 6 while maintaining a high degree of bearing surface between cylinder segments 34 and said base 6.

The bearing surfaces of segments 34 and base 6 are lubricated by means of an absorbent material such as felt saturated with a suitable lubricant and disposed between the respective operating levers 4 and 5 and base 6, as shown in Fig. 1. A small bracket 38 and screws, such as shown at 39 in Fig. 1, retain the absorbent material in such position. The arrangement is preferably such that upon brake releasing pivotal movement of the operating levers 4 and 5 relatively to base 6 associated therewith acts to compress slightly the absorbent material associated therewith to thus emit some of the lubricant which flows into the aforementioned roller and socket joints. It is further seen that the absorbent material acts as a seal to prevent foreign matter from entering the joint and causing damage to the bearing surfaces.

It is apparent that each operating lever 4 or 5 can be removed by simply detaching one of the mounting plates 36 from base 6 and sliding the operating lever outwardly for a distance of approximately one inch in a direction parallel to the axis of drum 1, and then lifting the same free of the other brake elements.

I claim:

1. In a magnetically operated friction brake, in combination, a brake drum, and a brake shoe and supporting and operating means for said shoe which comprises a base formed with an elongated recess, an energizable magnet member carried by said base, an operating member having an end portion confined in said recess through the medium of which said shoe is operable by said magnet member and a flexible metal strap attaching said operating member to said base for support thereby and for rocking in said recess.

2. In a magnetically operated friction brake, in combination, a brake drum, and a brake shoe and supporting and operating means for said shoe which comprises a base with an elongated recess formed in the upper surface thereof, an energizable magnet member carried by said base, a magnet armature member having a portion confined in said recess to afford operation of said shoe by said magnet member, and a flexible metal strap attaching said armature member to said base to prevent dislodgment of said armature member from said recess and for rocking in said recess.

3. In a magnetically operated friction brake, in combination, a brake drum, a brake shoe to effect stopping of said brake drum, and supporting and operating means for said shoe which comprises a base, an energizable magnet member carried by said base, a magnet armature member movably mounted on said base, a pivotally mounted brake shoe operating lever attached to said brake shoe, adjustable spacing means interposed between said armature member and said operating lever and acting to transmit motion of said armature member to said lever comprising a mounting bracket carried by said operating lever, a threaded bolt rotatably mounted on said bracket and a wedge-shaped spacer having a threaded opening for cooperation with said threaded bolt, said spacer thereby being movable relatively to said lever and said armature member to vary the distance therebetween.

4. In a magnetically operated friction brake, in combination, a brake drum, a brake shoe to effect stopping of said brake drum, and supporting and operating means for said shoe comprising an operating lever carrying said brake shoe and having an end portion formed into a segment of a cylinder, a base member formed with a recessed portion substantially complemental to said cylinder segment and fastening means for attaching said cylinder segment in said complementally formed portion to permit pivotal movement of said lever on said base, an energizable stationary magnet member carried by said base, a magnet armature member movably mounted on said base on the same side of said drum as said operating lever, adjustable spacing means interposed between said armature member and said operating lever and acting to transmit motion of said armature to said lever, said spacing means comprising a mounting bracket secured to said operating lever, a wedge-shaped spacer and means to afford adjustability of said spacer relatively to said lever and said armature.

5. In a magnetically operated friction brake, in combination, a brake drum, a brake shoe to effect stopping of said brake drum, and supporting and operating means for said shoe which comprises a base, an energizable magnet device carried by said base, a magnet armature member movably mounted on said base, a pivotally mounted brake shoe operating member supporting said brake shoe and mounted on said base between said drum and said armature member, adjustable spacing means interposed between said armature member and said operating member and acting to transmit motions of said armature member to said operating member, said means comprising a mounting bracket secured to one of said members, a wedge-shaped spacer and means to afford adjustability of said spacer relatively to said operating member and said armature member.

6. In a magnetically operated friction brake, in combination, a brake drum, a brake shoe, and supporting and operating means for said shoe which comprises a base formed with an elongated recess, an energizable magnet device carried by said base, a magnet armature member pivotally supported by said recess, a flexible strap attaching said armature member to said base for support thereby and for rocking in said recess, a brake shoe supporting member pivotally mounted in said base between said drum and said armature member for operation by said armature member, and an adjustable device carried by one of said members and comprising a spacer element movable relative to said members for adjusting the space therebetween.

7. The invention defined in claim 6, wherein said brake shoe supporting member comprises an end portion formed with a segment of a cylinder, a recessed portion complemental to said cylinder segment formed in said base for pivoting said supporting member, a pin extending from each end of said cylinder segment, mounting plates removably secured to said base and having bearing openings for accommodating said pins, and a lubricant saturated element adjacent said recessed portion for compression between said base and said brake shoe supporting member when the brake is released.

8. In a power operated friction brake, in combination, a brake drum, a brake shoe to effect stopping of said drum, a base member, an electromagnet and an armature mounted on said base member on the same side of said drum as said brake shoe for actuating said brake shoe, and supporting means for said brake shoe comprising a pivotal member carrying said brake shoe and operable by said armature, pivot means on said pivotal member and said base member for pivoting one end portion of said pivotal member on the latter, said pivot means comprising a segment of a cylinder on one of said members, a recessed portion substantially complemental to said cylinder segment on the other of said members, and fastening means for attaching said cylinder segment and said complementally formed portion to one another to afford pivotal movement of said pivotal member on said base member, and an adjustable device mounted on said pivotal member and comprising a spacer element movable relative to said pivotal member and said armature for adjusting the space therebetween.

9. In an electromagnetically operated friction brake, in combination, a brake drum, a brake shoe to effect stopping of said drum, a base member, an electromagnetically operable device mounted on said base member on the same side of said drum as said brake shoe for actuating said brake shoe, and supporting means for said brake shoe comprising a supporting member carrying said brake shoe and operable by said electromagnetically operable device, pivot means on said supporting member and said base member for pivotally securing one end portion of said supporting member on said base member, said pivot means comprising a segment of a cylinder on one of said members, a recessed portion substantially complemental to said cylinder segment on the other of said members, and fastening means comprising a pin extending from each end of said cylinder segment, mounting plates each having a bearing opening for receiving one of said pins and attached to said other member on opposite sides of said complementally formed portion to fasten said members to one another and to permit pivotal movement of said supporting member on said base member, and adjustable spacing means mounted on said supporting member between the latter and said electromagnetically operable device, said spacing means having a surface for abutting a surface of said device in any adjustable position of said spacing means.

10. In a magnetically operable friction brake, in combination, a brake drum, a brake shoe to effect stopping of said brake drum, a base, a magnetically movable member mounted on said base on the same side of said drum as said brake shoe for operating said brake shoe, and supporting means for said brake shoe comprising a supporting member carrying said brake shoe and operable by said movable member and having an end portion formed into a segment of a cylinder, said base having a recessed portion substantially complemental to said cylinder segment, and fastening means attaching said cylinder segment in said complementally formed base portion to permit pivotal movement of said supporting member on said base, and lubricating means for said cylinder segment and complemental portion comprising a lubricant saturated member positioned adjacent said complemental portion to emit a portion of the lubricant as an incident to pivotal movement of said supporting member on said base, and an adjustable device carried by one of said members and comprising a spacer element movable relative to said members for adjusting the space therebetween.

11. In a friction brake, in combination, a brake drum, a brake shoe to effect stopping of said drum, supporting means for said brake shoe comprising an operating lever carrying said brake shoe and having an end portion formed into a segment of a cylinder, a base member formed with a recessed portion substantially complemental to said cylinder segment, and fastening means for attaching said cylinder segment in said complementally formed portion to permit pivotal movement of said lever on said base, electromagnetic means having a pivoted armature mounted on said base member on the same side of said drum as said operating lever for actuating said supporting means, and adjustable spacing means mounted on said supporting means between said armature and said supporting means, said spacing means having a surface which is substantially complemental to the surface of said armature in any adjustable position of said spacing means.

References Cited in the file of this patent

UNITED STATES PATENTS

| | | |
|---|---|---|
| 1,120,728 | Lutz | Dec. 15, 1914 |
| 1,279,777 | Stein | Sept. 24, 1918 |
| 1,809,603 | Reed | June 9, 1931 |
| 2,087,478 | Hodgson | July 20, 1937 |
| 2,473,360 | Burgett | June 14, 1949 |
| 2,622,630 | Cram | Dec. 23, 1952 |
| 2,642,160 | Bedford et al. | June 16, 1953 |

FOREIGN PATENTS

| | | |
|---|---|---|
| 410,471 | Great Britain | May 15, 1934 |